(12) United States Patent
Moeck et al.

(10) Patent No.: US 7,408,926 B1
(45) Date of Patent: Aug. 5, 2008

(54) METHOD AND APPARATUS FOR ACCESSING VOICE OVER INTERNET PROTOCOL CONNECTION

(75) Inventors: Andrew M. Moeck, Huntington Beach, CA (US); Wendell D. Brown, Las Vegas, NV (US)

(73) Assignee: Microsoft Corporation, Redmond, WA (US)

( * ) Notice: Subject to any disclaimer, the term of this patent is extended or adjusted under 35 U.S.C. 154(b) by 722 days.

(21) Appl. No.: 10/934,830

(22) Filed: Sep. 2, 2004

(51) Int. Cl.
*H04L 12/66* (2006.01)
*H04L 12/56* (2006.01)
*H04J 3/22* (2006.01)

(52) U.S. Cl. .................. 370/352; 370/401; 370/466; 370/467

(58) Field of Classification Search .................. None
See application file for complete search history.

(56) References Cited

U.S. PATENT DOCUMENTS 7,006,436 B1 * 2/2006 Chu et al. .................. 370/230
7,050,422 B2 * 5/2006 Xu et al. .................... 370/352
7,068,646 B2 * 6/2006 Fangman et al. ............ 370/352
2005/0201357 A1 * 9/2005 Poyhonen .................. 370/352
2007/0192508 A1 * 8/2007 Sollee ....................... 709/245

* cited by examiner

*Primary Examiner*—Chi H. Pham
*Assistant Examiner*—Soon D. Hyun
(74) *Attorney, Agent, or Firm*—Vierra Magen Marcus & DeNiro LLP

(57) ABSTRACT

A service is provided through an apparatus operative under Internet Protocol (IP) as part of the Internet to handle packet switched voice traffic according to Session Initiation Protocol (SIP) to control incoming packet switched control traffic by fielding SIP control traffic and substituting control signals that can traverse a firewall and handle Network Access Traversal (NAT) over an Internet Protocol (IP) network. To this end, a client behind a firewall initiates an outbound multimedia stream via a conventional voice path according to the Realtime Transport Protocol (RTP) to a SIP gateway, which in turn routes voice traffic via the Internet to the client using an XML interface to bypass the SIP-designated ports. The interface bridges the firewall and is supported by a server on the Internet that handles conventional SIP UDP interface traffic.

20 Claims, 6 Drawing Sheets

METHOD AND APPARATUS FOR ACCESSING VOICE OVER INTERNET PROTOCOL CONNECTION

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

This invention related to Internet Protocol-based voice communications, also known as voice over IP (VoIP), wherein telephone traffic is transported according to Internet-Protocol, that is using IP networks with packet switched communication. This invention is particularly useful in replacing conventional circuit-switched voice communication links.

Client/server model VoIP packet switched voice communication is known. An example is computer to computer VoIP using the Internet through high speed connections, such as a cable modem. Other examples are computer-to-telephone/telephone-to-computer configurations where outbound call routing is effected through plain old telephone services (POTS). Such configurations employ what is know as the H.323 protocol. The H.323 protocol is evidently limited in that it is not readily adaptable to handle incoming conventional telephone traffic.

A further example is a computer-to-telephone/telephone-to-computer configuration based on a standard protocol designated Session Initiated Protocol (SIP) SIP permits seamless POTS telephone-to-telephone calling via a direct interface connection or via routers and the like to high-speed cable and DSL portals into the Internet so that the voice path takes advantage of packet switched circuit efficiencies, such as use of a channel only when information is being transmitted and built-in error detection and correction. Such a routing control is ideally seamless to conventional telephone systems and private networks. Commercial products are emerging that employ SIP as the control path protocol. Recently, AT&T CallVantage was announced as a new service to augment the local and long distance services offered by AT&T. It has not yet been widely adopted.

FIG. 1 illustrates a conventional Voice over IP system 10. A SIP-to-public-switched telephone gateway provider 12 manages voice and control signals via logical paths 14 to and from the Internet, which is represented by an Internet cloud 16. Further logical paths 18 are coupled from the Internet cloud 16 to a Local Area Network (LAN) 20, where it typically must traverse a firewall 22 to provide logical paths 24 for voice and control to a Voice over IP (VoIP) client 26.

The SIP protocol has certain technical weaknesses which may prevent its widespread proliferation. Because SIP specifies use of UDP (User Datagram Protocol) port assignments that are nonstandard, namely, UDP ports 5060 and 5062, the SIP protocol cannot bridge the types of firewalls that protect many computer systems. More importantly, SIP protocol has a problem routing incoming calls through a firewall. This is known as a Network Access Traversal (NAT) procedure. The SIP protocol has become widely accepted, and these two SIP characteristics have been identified and have been used by some circuit switch-based telephone services to proactively block SIP ports and prevent IP traffic from using circuit-switched infrastructure to respond to incoming calls.

What is needed is a mechanism to allow VoIP to serve SIP controlled traffic through conventional firewalls and to permit both incoming and outgoing telephone traffic from conventional handsets.

SUMMARY OF THE INVENTION

According to the invention, a service is provided through an apparatus operative under Internet Protocol (IP) as part of the Internet to handle packet switched voice traffic according to Session Initiation Protocol (SIP) to control incoming packet switched control traffic by fielding SIP control traffic and substituting control signals that can traverse a firewall and handle Network Access Traversal (NAT) over an Internet Protocol (IP) network. To this end, a client behind a firewall initiates an outbound multimedia stream via a conventional voice path according to the Realtime Transport Protocol (RTP) to a SIP gateway, which in turn routes voice traffic via the Internet to the client using the same RTP stream. The interface bridges the firewall and is supported by a server on the Internet that handles conventional SIP/UDP interface traffic.

The invention will be better understood by reference to the following detailed description in connection with the accompanying drawings.

DESCRIPTION OF SPECIFIC EMBODIMENTS OF THE INVENTION

Figure 1:
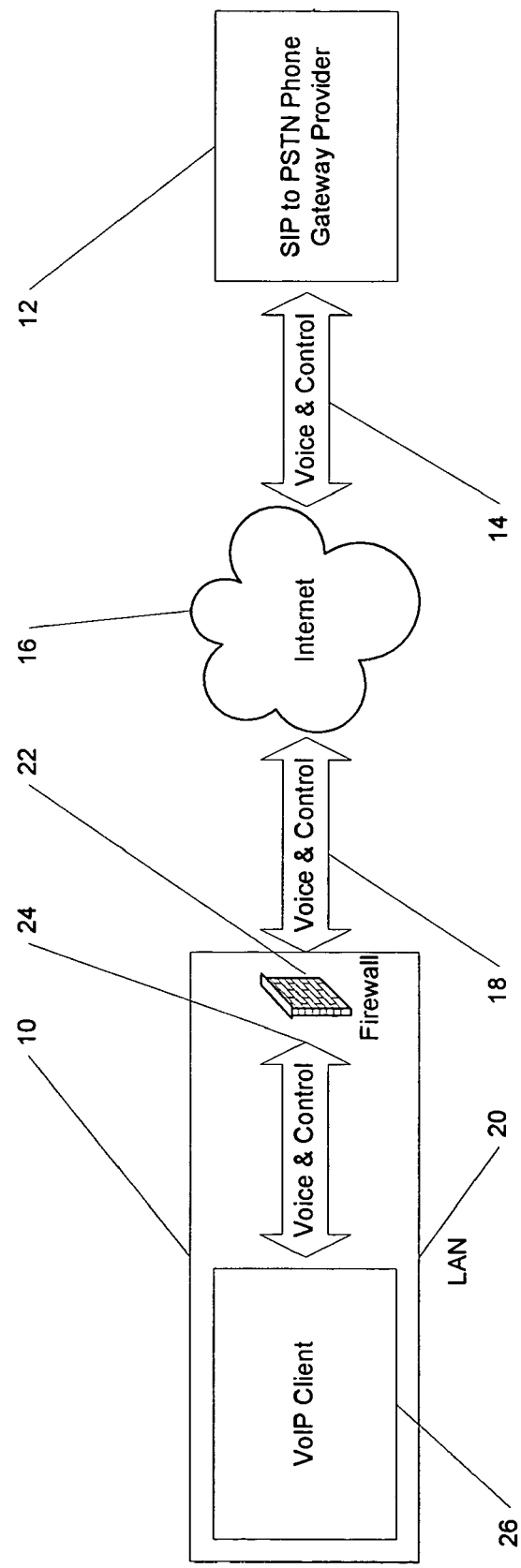
FIG. 1 is a block diagram of a representative VoIP system of the prior art.
Figure 2:
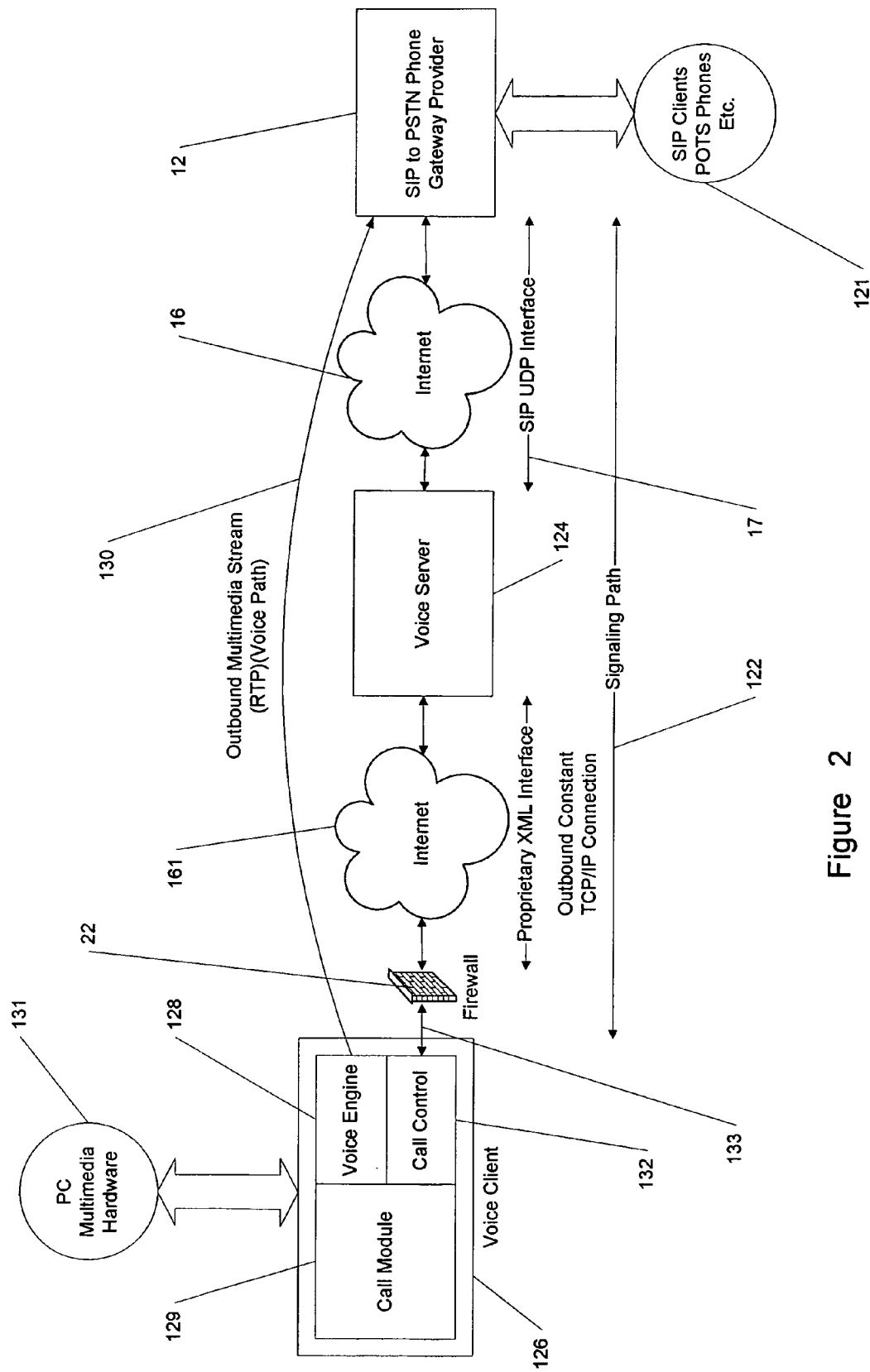
FIG. 2 is a block diagram of one embodiment of a VoIP system according to the invention.

FIG. 2 is a block diagram of an embodiment of Voice over IP Network 100 in accordance with the invention. A conventional SIP to public switched telephone network (PSTN) phone gateway provider 12 communicates with conventional SIP clients and ordinary phones 121 and employs the Internet cloud 16 as an SIP to UDP (Universal Data Port) interface 17 on a signaling path 122 to a voice client 126 having a voice engine 128, a call module 129 and a call control module 132. A server according to the invention, herein a voice server 124, resides in the Internet cloud 16, 161 between the Gateway Provider 12 and a conventional firewall 22. According to the invention, the voice engine 128 in the voice client 126 establishes, for example in response to a call connection request via the voice server 124, an outbound media stream 130 RTP via a conventional voice path directly to the gateway provider 12. The gateway provider 12 communicates via the Internet cloud 16 acting as the SIP UDP interface to the voice server 124 to complete the call setup. Specifically, the voice server 124 connection enables the voice server 124 to redirect the standard ports of the SIP UDP interface 17 via the proprietary XML interface 18 through the Internet cloud 161 to traverse the firewall 22 and access, bidirectionally, to the call control module 132 of the voice client 126. Thus call control can be implemented bidirectionally to and from SIP clients, POTS phones and the like 121.

Figure 3:
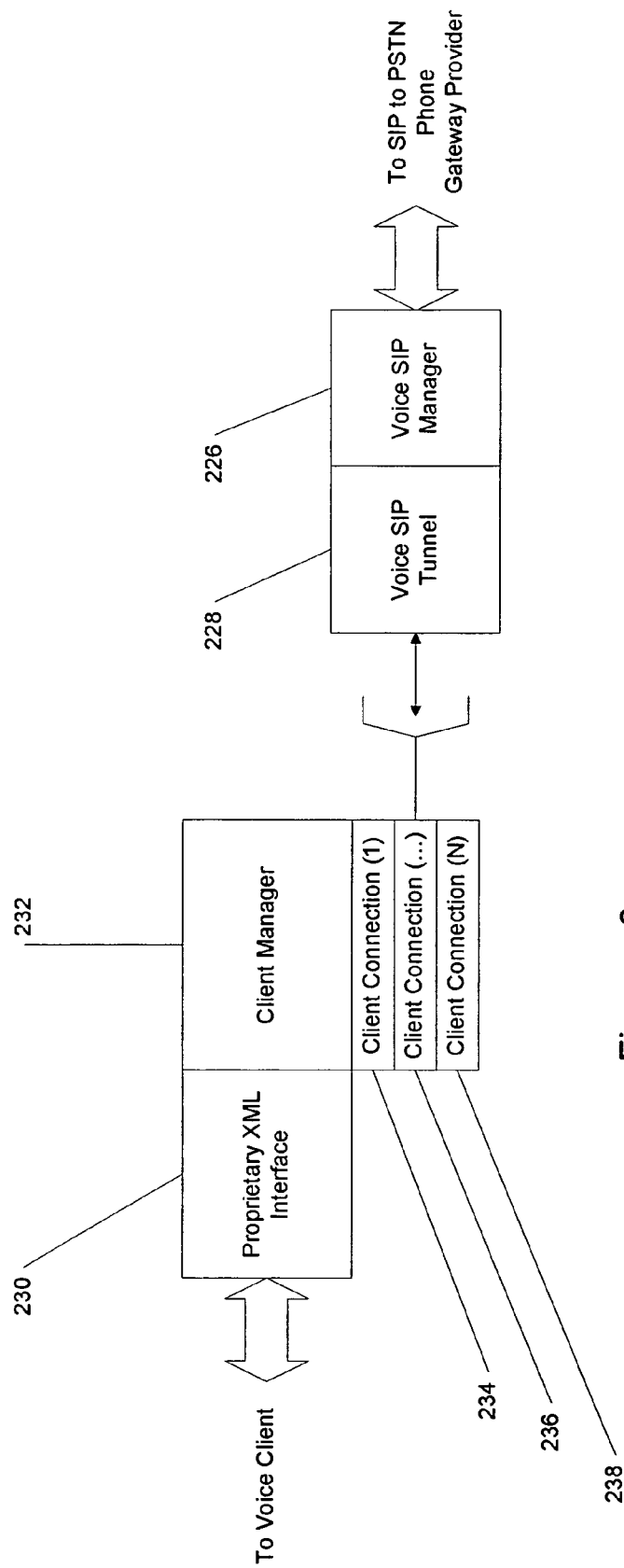
FIG. 3 is a block diagram of one embodiment of a VoIP server, or client manager and SIP manager, according to the invention.

FIG. 3 illustrates the elements of the voice server 124. Interfacing with the gateway provider 12 (FIG. 2) via the Internet is an SIP manager 226 feeding an SIP tunnel module 228. A proprietary XML interface 230 via the Internet provides a conduit for a client manager 232. The client manager 232 manages up to N client connections 234, 236, 238, each of which feeds the SIP tunnel 228. The operation of the voice server 124 is more precisely articulated by reference to the following procedure in pseudo-code form.

The Voice Server 124 accepts incoming call control packets from both the Voice Client 126 and the SIP to PSTN Phone Gateway Provider 12 for the purpose of initialing and controlling calls (Step A). For example, the Voice Client 126 could send messages to the Voice Server 124 to initiate a new outbound call to a PSTN phone and at some point later the SIP to PSTN Phone Gateway Provider 12 could send a message to the Voice Server 124 terminating said call. Another example could be where the SIP to PSTN Phone Gateway Provider 12 could send a message to the Voice Server 124 initiating a new inbound call from a PSTN phone to a Voice Client 126. The voice server 124 performs the following:

Bind the actual Voice Server 124 to the physical server socket 12 on the server computer hardware for connections 234, 236, 238 from client phones (Step B).

wait for new client to connect (Step C)
    create a new thread to handle new client session (Step D)
    wait for Input/Output from the connected client (Step E)
    parse input received into a valid XML message (Step F)
    invoke the "siphandlerfactory" to create in real time a specialized handler for the XML message (Step G)
    conduct a SIP session with the SIP gateway with a first specialized handler according to generally accepted SIP telecommunications standard (SIP RFC Telecommunications Standard 2543) (Step H)
    send call control XML commands via the XML Interface 230 to the corresponding client via a second specialized handler (Step I)
    close session once either the client or the handler terminates connection (Step J)
    continue in a waiting mode for next new clients to connect (Step K)

The process thereafter repeats.

Figure 4:
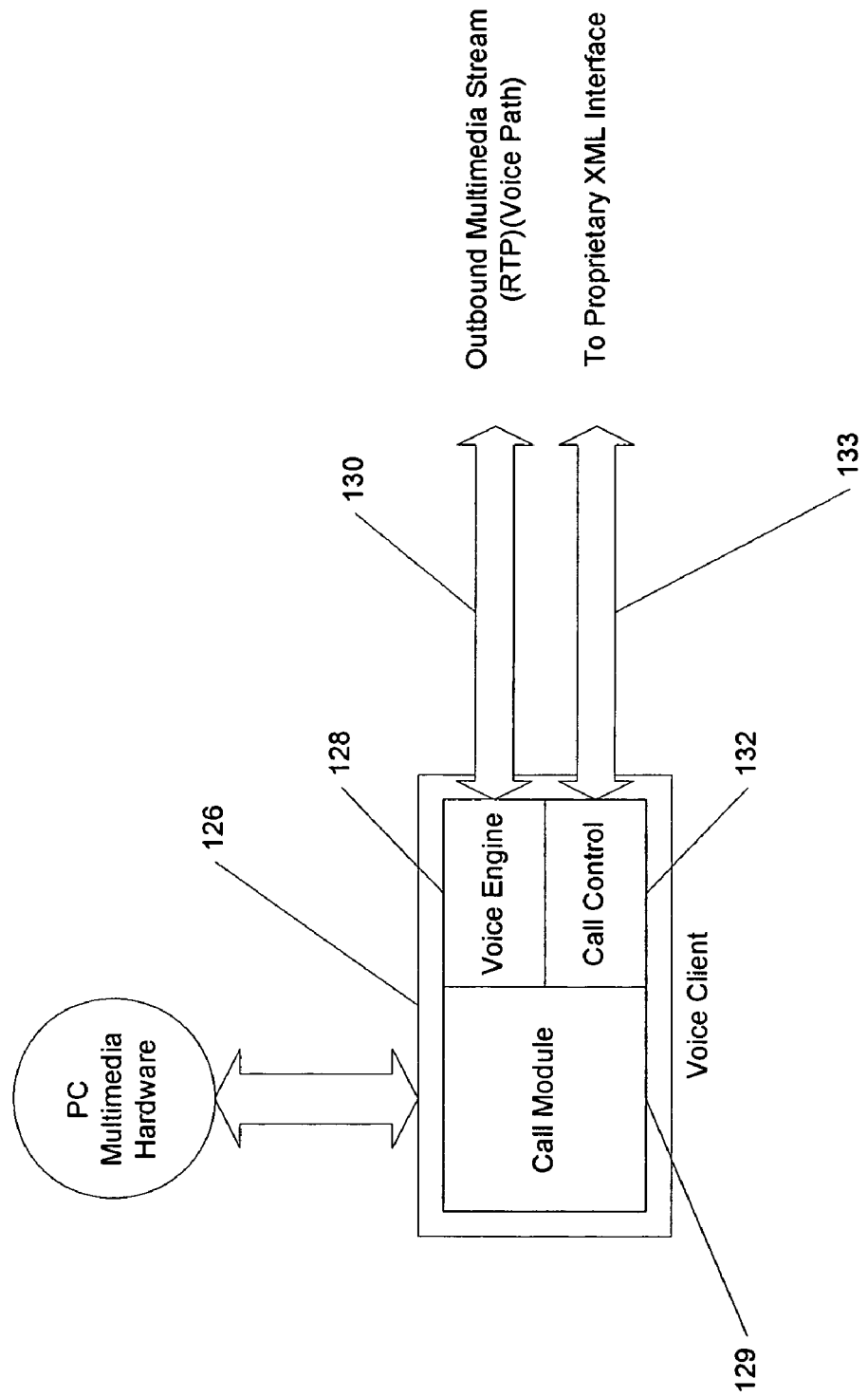
FIG. 4 is a block diagram of one embodiment of a VoIP client according to the invention.
Figure 5A:
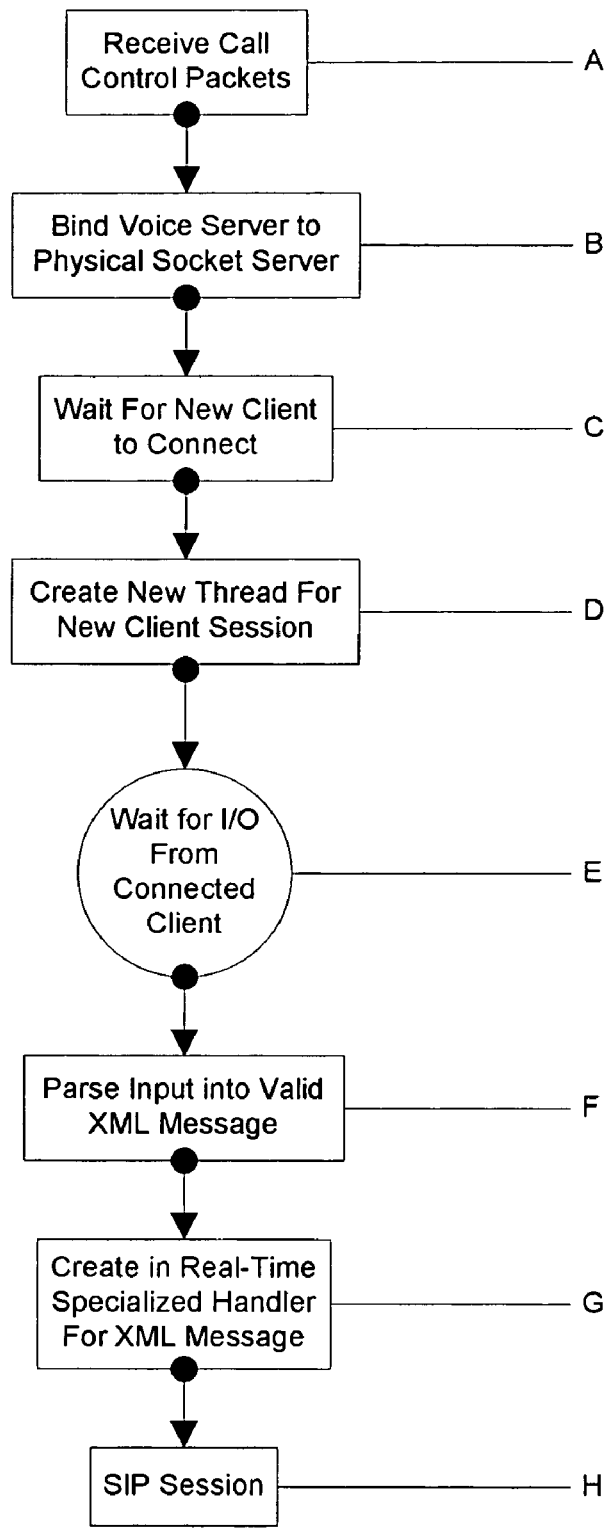
FIGS. 5A and 5B together are a flow chart of control setup protocols according to one embodiment of the invention.
Figure 5B:
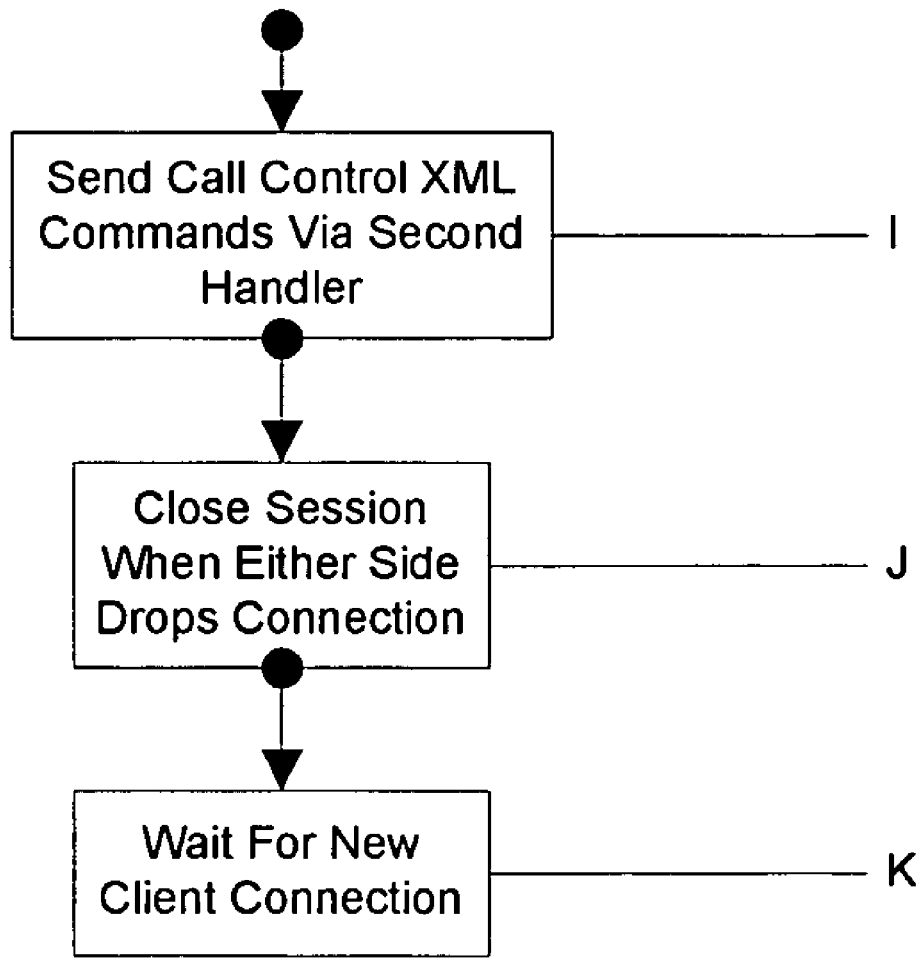

After connection of clients, such as the voice client 126, the voice server 124 enables the packet switched exchange of voice packets between the SIP clients 121 and any PC hardware 131 coupled to the voice client 126. FIG. 4 illustrates elements of a voice client according to the invention. A voice engine 128 interacts with a call module 129, a call control module 132 and generates traffic via an outbound media stream 130. There is typically a firewall 22 external to the voice client 126 in the path 133 to the proprietary XML interface 230. The voice client 126 handles the control and voice communication with the PC multimedia hardware 131, such as microphone, sound card, loudspeaker and related processors, storage and human interface.

The voice engine 128 of the voice client 126 may be a commercial software-based product such as the GIPS VoiceEngine™. The GIPS VoiceEngine™ may be licensed from Global IP Sound AB of Stockholm, Sweden and of San Francisco, Calif., U.S.A. The voice engine 128 handles all of the multimedia stream Realtime Transfer Protocol (Voice Path) connection details. It is implemented as a data link library (DLL) that is linked to the call module 129. The call module 129 interacts through an interface defined for the GIPS VoiceEngine by Global IP. (Reference is made to the following URL as of August 2004 for further information: http://www.globalipsound.com/)

Pseudo code representations for the SIP parser are embedded in the voice server 126 pseudo code given below:

Open Single UDP Connection to SIP Network Operator
    Block on Read
    If SIP Message from SIP Network Operator
        Read::100 Trying
        SIP/2.0 100 Trying
        Via: SIP/2.0/UDP 198.92.120.94;branch=4ad236c5-b688-4f55-a1c2-60d3f5af038d;received=198.92.120.94
        From: <sip:GoY41AEX66@gw5.voicepulse.com>; tag=3eee41b7
        To: <sip:GoY41AEX66@gw5.voicepulse.com>; tag=as7e915ca5
        Call-ID: 4ad236c5-b688-4f55-a1c2-60d3f5af038d
        CSeq: 2 REGISTER
        User-Agent: Asterisk PBX
        Allow: INVITE, ACK, CANCEL, OPTIONS, BYE, REFER
        Contact: <sip:GoY41AEX66@66.234.228.132>
        Content-Length: 0
    Parse SIP Message
    Create corresponding SIP Message Object from parsed SIP Message

```
class SIP200: public sip::SipServerHandler
{
  private:
    int_cseq;
    const string_branch;
    const string_toTag;
    const string_fromTag;
  public:
    SIP200(sip::SipSession* session);
    void handle(const sip::SIPUnsolicited& un);
    const string toString( );
    const string getBranch( ) const {return_branch};
    const string getToTag( ) const {return_toTag;};
    const string getFromTag( ) const {return_fromTag;
    };
};
```

Return SIP Message Object to Voice Server for Execution

The typical RTP connection is established in accordance with the following process:

The voice client 128 (FIG. 4) sends a call request to the voice server 124 (FIG. 3) (Step L).

The voice server 124 thereupon exchanges signals and interacts with the SIP to PSTN phone gateway provider 12 (FIG. 3) to establish a call connection path. (Step M) To do so, the SIP to PSTN phone gateway provider 12 sends RTP connection information back to the voice server 124 (Step M), which in turn parses the message (Step N) and constructs the appropriate proprietary XML message (containing the RTP connection information: IP address and port number) (Step O), which is eventually sent back to the requesting voice client 126 (Step P).

The voice client 126 passes the RTP connection information to the voice engine 128 (Step Q), where it establishes an outbound connection to the provided IP address and port number. This connection stays active until the SIP to PSTN phone gateway provider 12 receives a hang-up message from the voice server 124 (Step P) (This sequence is initiated from the voice client 126 when the computer user terminates a call.) or from the dialed POTS unit 121 (This sequence is initiated when the phone user called terminates the call).

The operating system for the voice server 124 is preferably implemented in the C++ language or the like with use of the ACE library for UNIX type platforms, since UNIX is well adapted to communication environments. Since the application is highly multi-threaded, it may use numerous operating system level constructs throughout. In addition, the voice server 124 may rely on a local database for all call session management and administrative functionality.

The operating system for the voice client 126 may be implemented as an application on any Microsoft Windows operating system on a personal computer that has an Internet connection, such as Windows XP. The voice client 126 does not use any specific databases or any specific low level operating system functionality that would preclude it from running on other operating systems.

The proprietary XML interface 230 provides communication between the voice client 126 and the voice server 124 over TCP/IP. The XML conventions are defined in Document Type Definition (DTD).

The server-to-client.dtd code describes the messages sent from the voice server 124 to the voice client and in one embodiment is given by the following XML code:

```
<?xml version='1.0' encoding="UTF-8"?>
<!ELEMENT sipResponse (sipVersion,
sipOk|sipConnect|sipHangUp)/>
<!ELEMENT sipVersion (date, version)>
<!ELEMENT date (#PCDATA)>
<!ELEMENT version (#PCDATA)>
<!ELEMENT sipRinging (uName, digits)>
<!ELEMENT uName (#PCDATA)>
<!ELEMENT callID (#PCDATA)>
<!ELEMENT digits (#PCDATA)>
<!ELEMENT sipHangUp (uName, callID)>
<!ELEMENT uName (#PCDATA)>
<!ELEMENT callID (#PCDATA)>
<!ELEMENT sipConnect (rtpAddress, rtpPort)>
<!ELEMENT rtpAddress (#PCDATA)>
<!ELEMENT rtpPort (#PCDATA)>
<!ELEMENT sipOk (uName, callID)>
<!ELEMENT uName (#PCDATA)>
<!ELEMENT callID (#PCDATA)>
```

Similarly, the client-to-server.dtd code describes in XML code the messages sent from the voice client 126 to the voice server 124, as follows:

```
<?xml version='1.0' encoding="UTF-8"?>
<!ELEMENT sipRequest (sipVersion,
sipRegister|sipUnRegister|sipPlaceCall|sipHangUp)>
<!ELEMENT sipVersion (date, version)>
<!ELEMENT date (#PCDATA)>
<!ELEMENT version (#PCDATA)>
<!ELEMENT sipRegister (uName, Password)>
<!ELEMENT uName (#PCDATA)>
<!ELEMENT Password (#PCDATA)>
<!ELEMENT sipUnRegister (uName)>
<!ELEMENT uName (#PCDATA)>
<!ELEMENT sipPlaceCall (uName, digits)>
<!ELEMENT uName (#PCDATA)>
<!ELEMENT digits (#PCDATA)>
<!ELEMENT sipHangUp (uName, callID)>
<!ELEMENT uName (#PCDATA)>
<!ELEMENT callID (#PCDATA)>
```

In order to control the client-server environment, a main application is invoked, typically at the voice client 124 as part of the client manager, as represented by the following pseudo code:

Start up of the Voice Client 124 Application:
Create Object of ConnectionMgr 232 (Step Q).
Create Object of XMlparser (Step R).
Register the main application to handle events of ConnMgr and XML Parser objects. (Once registered, the main application will receive and send connection events such as Register and Call Control to and from the Talk Express Voice Server producing XML Parser objects for processing. (Step S) ( Read Talk Express Voice Client Skinnable Configuration Parameters from Configuration File. The Configuration File (below) defines which Icons, Images, and Logos will be displayed on the skinnable interface. (Step T).

```
<xml version="1.0">
<clientConfig>
<debugFlag>1</debugFlag>
<icons>
   <key1>keypad1.ico</key1>
   <key2>keypad2.ico</key2>
   <key3>keypad3.ico</key3>
   <key4>keypad4.ico</key4>
   <key5>keypad5.ico</key5>
   <key6>keypad6.ico</key6>
   <key7>keypad7.ico</key7>
   <key8>keypad8.ico</key8>
   <key9>keypad9.ico</key9>
   <key0>keypad0.ico</key0>
   <keystar>keypadasterisk.ico</keystar>
   <keypound>keypadpound.ico</keypound>
   <formlogo>logo64x64.ico</formlogo>
   <systray>logo64x64.ico</systray>
</icons>
<userData>
   <uName>andruw@andruw.ac</uName>
   <Password>pwd</Password>
</userData>
<serverData>
   <serverName>sipserver.talkexpress.com</serverName>
   <IP>sipserver.talkexpress.com</IP>
   <port>8888</port>
</serverData>
<firstRun>
   <value>1</value>
</firstRun>
</clientConfig>
```

Prepare the skin by loading the appropriate Icons, Images, and Logos defined in the Configuration File and show the client window on computer Desktop. (Step U).

Read Server Configuration Parameters (<serverData>) from Configuration File and Register with Talk Express Voice Server 124 (Step V).

Show Application Error if Configuration File Syntax Error and close the Talk Express Voice Client.

Wait for Incoming packets from Talk Express Voice Server (Step W).

IF a packet is read THEN fire off the event for XML parser with XML code from the packet (Step X) and then
fire off the event for the Main Application (Step Y).

The main application receives the event (a call) and handles it, either as outbound or inbound (Step Z).

For Out Bound call, a user enters the phone number or phone address by numerical sequence or name (Step AA).

The main application converts the alphabetics into its appropriate numeral code (Step AB) and sends an XML message text string to the call control module (????)(Step AC).

The receiving call control module 132 prepares the event for the XML parser in the call control module 132 (Step AD).

Upon receiving the XML prepare Event, the XML parser prepares the XML code (Step AE), packs it into the text string (Step AF) and fires the XML ready event for the connection manager object (Step AG).

The connection manager object takes this XML text string and sends it to the voice server 124 (Step AH).

The voice server 124 responds with an XML message text string (Step AI).

The voice server 124 response XML message text string is then parsed (Step AJ).

The voice client 126 uploads the parsed XML message text string data received (Step AK)

The voice client 126 connects the voice engine 128 to the specified RTP IP address and port as identified in the XML message text string (Step AL).

Once a call is finished and a termination flag or signal is sense, the voice client 126 tells the voice engine 128 to close the connections (Step AM).

Throughout the call, the main application should cause the local voice client to display to a user the current status of its call. The foregoing system operates according to a method that can handle both nonstandard User Datagram Port assignments and Network Access Traversal (NAT) protocol over an Internet Protocol (IP) network response to commands according to Session Initiation Protocol (SIP) standards.

The invention has been explained with reference to specific embodiments. Other embodiments will be evident to those of skill in the art. It is therefore not intended that the invention be limited except as indicated by the appended claims.

What is claimed is:

1. A computer implemented method for handling voice call connections and handling packet switched voice traffic over an Internet Protocol network according to Session Initiation Protocol, the method comprising:
   converting Session Initiation Protocol messages respecting port assignments into non-SIP messages with alternative port assignments at a voice server in the Internet Protocol network, the non-SIP messages modified so as to not be in SIP format; and
   communicating the non-SIP messages to a voice client on an internal computer network using said alternative port assignments, the voice client residing in the computer network connected to the Internet, the non-SIP messages communicated to the voice client without regard to Network Access Traversal (NAT) configurations.

2. The computer implemented method according to claim 1 wherein said network has a firewall in a path of voice traffic and said alternative port assignments bypass said firewall.

3. A system for handling voice call connections and handling packet switched voice traffic over an Internet Protocol network according to Session Initiation Protocol the system comprising:
   a voice server in the Internet Protocol network that converts Session Initiation Protocol messages respecting port assignments into non-SIP messages with alternative port assignments; and
   a voice client on an internal computer network that receives the non-SIP messages using said alternative port assignments such that the voice client resides in the computer network connected to the Internet without regard to Network Access Traversal (NAT) configurations and looks like a regular SIP phone to any downstream network.

4. The system according to claim 3 wherein said network has a firewall in a path of voice traffic and said alternative port assignments bypass said firewall.

5. The computer implemented method of claim 1, wherein said step of converting Session Initiation Protocol messages includes:
   converting SIP messages into a new message having an internet protocol (IP) format.

6. The computer implemented method of claim 1, wherein said step of converting includes:
   parsing the message into a new message having an internet protocol (IP) format.

7. The computer implemented method of claim 6, wherein the new message is an extended markup language (XML) message.

8. The computer implemented method of claim 6, wherein said step of parsing includes:
   constructing an XML message which includes connection information.

9. The computer implemented method of claim 8, wherein the connection information includes RTP connection information of IP address and connection port.

10. The computer implemented method of claim 1, wherein said step of converting includes:
    creating a first handler to communicate with an SIP gateway.

11. The computer implemented method of claim 1, creating a second handler to communicate with a client using XML commands.

12. The computer implemented method of claim 1, further comprising:
    establishing an RTP connection by the voice server between a voice client and a gateway, the gateway configured to communicate using an SIP format and the voice client configured to communicate using IP format.

13. The system of claim 3, further comprising:
    a call module that translates the non-SIP messages into multimedia data and provides the data to multimedia hardware.

14. The system of claim 13, further comprising:
    a call control module that establishes a connection with the voice server.

15. The system of claim 14, wherein said voice client, call module and call control module are contained on a single client machine.

16. A computer implemented method for handling voice call connections and handling packet switched voice traffic, comprising:
    receiving a request by a first server to establish a connection between a client communicating over an IP network and a gateway communicating using Session Initiation Protocol (SIP);
    receiving call control packets from the client by the first server;
    establishing a connection with the client by the first server;
    receiving input from the connected client by the first server;
    parsing the received input into an extended markup language message;
    transmitting the extended markup language message to the gateway;
    receiving SIP messages from the gateway;
    converting the SIP messages into non-SIP messages with modified port information; and
    communicating the non-SIP messages to the client using the modified port information.

17. The computer implemented method of claim 16, wherein the first server is located in an IP network.

18. The computer implemented method of claim 16, further comprising:

establishing an RTP connection between the client and the gateway.

19. The computer implemented method of claim 17, wherein said step of establishing an RTP connection includes:

receiving a request for a connection between a client device within an Internet Protocol network and a gateway configured to communicate in Session Initiation Protocol, a firewall mechanism configured to intercept traffic for the client device in the Internet Protocol network;

accessing RTP connection information for the gateway, the RTP connection information including an internet protocol address and a port identifier;

constructing a call request message with the gateway connection information, the call request message being a message in extended markup language; and transmitting the call request message to the client device, the call request message enabling the client to establish an RTP connection with the gateway.

20. The computer implemented method of claim 19, wherein said step of transmitting the call including:

transmitting the call to the IP address and port number specified in the RTP connection information.

\* \* \* \* \*